United States Patent [19]

Nobuhara

[11] Patent Number: 4,662,810
[45] Date of Patent: May 5, 1987

[54] STOPPER DEVICE FOR POSITIONING A PUSH CAR AND THE LIKE

[75] Inventor: Uichi Nobuhara, Kishiwada, Japan

[73] Assignee: Kabushiki Kaisha Kumalift Gijutsu Kenkyusho, Osaka, Japan

[21] Appl. No.: 807,875

[22] Filed: Dec. 11, 1985

[30] Foreign Application Priority Data

Apr. 1, 1985 [JP] Japan ............................ 60-49387[U]

[51] Int. Cl.⁴ .......................... B65G 67/00; F16H 1/14
[52] U.S. Cl. ........................................ 414/396; 49/49;
74/411.5; 74/417; 414/401
[58] Field of Search ...................... 74/411.5, 417, 423,
74/530; 49/49, 68; 187/51, 56, 59; 414/396,
401, 584

[56] References Cited

U.S. PATENT DOCUMENTS

| | | | |
|---|---|---|---|
| 2,910,743 | 11/1959 | Muhn | 74/530 X |
| 3,169,652 | 2/1965 | Ewell | 414/396 |
| 3,710,961 | 1/1973 | Bomstein | 414/396 |
| 4,199,290 | 4/1980 | Jacoby | 414/401 |
| 4,549,444 | 10/1985 | Forquer | 74/411.5 |

Primary Examiner—Allan D. Herrmann
Attorney, Agent, or Firm—Wenderoth, Lind & Ponack

[57] ABSTRACT

A stopper device for positioning a push car in front of the door of an elevator. The stopper device has a horizontally pivoting arm, a vertically pivoting arm and a pair of gears interlocking them with each other. The horizontally pivoting arm is locked by a stopper to its operative position and the stopper is kept in its operative position by a pushing member.

12 Claims, 7 Drawing Figures 4,662,810

STOPPER DEVICE FOR POSITIONING A PUSH CAR AND THE LIKE

BACKGROUND OF THE INVENTION

The present invention relates to a stopper device for positioning a push car and the like, or more particularly to a device for stopping the push car in such a position as to make it ready to be drawn onto an elevator by means of a transfer apparatus provided on the elevator.

A push car cannot be efficiently conveyed from one story of a building to another if a worker loads an elevator with the push car and unloads the elevator only by his bodily powers. A known attempt to solve the above problem is based on a concept that the work of loading the elevator with the push car and unloading the push car from the elevator should be automatized. An automatic transfer apparatus based on this concept includes a movable endless chain conveyor, the travel of which ranges from the position where its full length installs itself on the elevator to the position where some portion of the conveyor projects from the elevator to a floor. Pins provided on the endless chain conveyor are adapted to engage with pins provided downwardly on the under surface of the push car. The above-described automatic transfer apparatus requires a positioner because if the push car is not exactly positioned in front of the elevator, the push car cannot be drawn from the floor onto the elevator.

SUMMARY OF THE INVENTION

It is an object of the present invention to provide a stopper device which automatically positions a push car in front of an elevator when the door of the elevator is closed and automatically makes the push car ready for passing when the door of the elevator is opened.

The stopper device according to the present invention includes a vertically pivoting arm and a horizontally pivoting arm connected with each other by means of a bevel gear and a bevel pinion. A stopper provided in the proximity of the horizontally pivoting arm is adapted to be vertically pivoted so as to engage therewith. When the stopper engages with the horizontally pivoting arm, the latter is kept in a projecting position. A pushing member such as a cam is provided to keep the stopper in its operative position with the vertically pivoting arm in its upper position.

The vertically pivoting arm is adapted to be actuated by the upper and lower leaves of the door of an elevator. A push car stops when it touches the tip of the horizontally pivoting arm. When the door is closed, the horizontally pivoting arm is locked by the stopper in its operative projecting position. The push car butts the horizontally pivoting arm and is positioned in position with respect to the elevator. When the door is opened, the vertically pivoting arm becomes free, pivoting downwardly. At the same time, the pressing member releases the stopper, which releases the horizontally pivoting arm, so that the latter will retract to its inoperative retracted position. Now, the transfer apparatus can pull the push car into the elevator or out of it.

BRIEF DESCRIPTION OF THE DRAWINGS

Other objects and features of the present invention will become apparent from the following description taken with reference to the accompanying drawings, in which.

DETAILED DESCRIPTION OF THE PREFERRED EMBODIMENT

Figure 1:
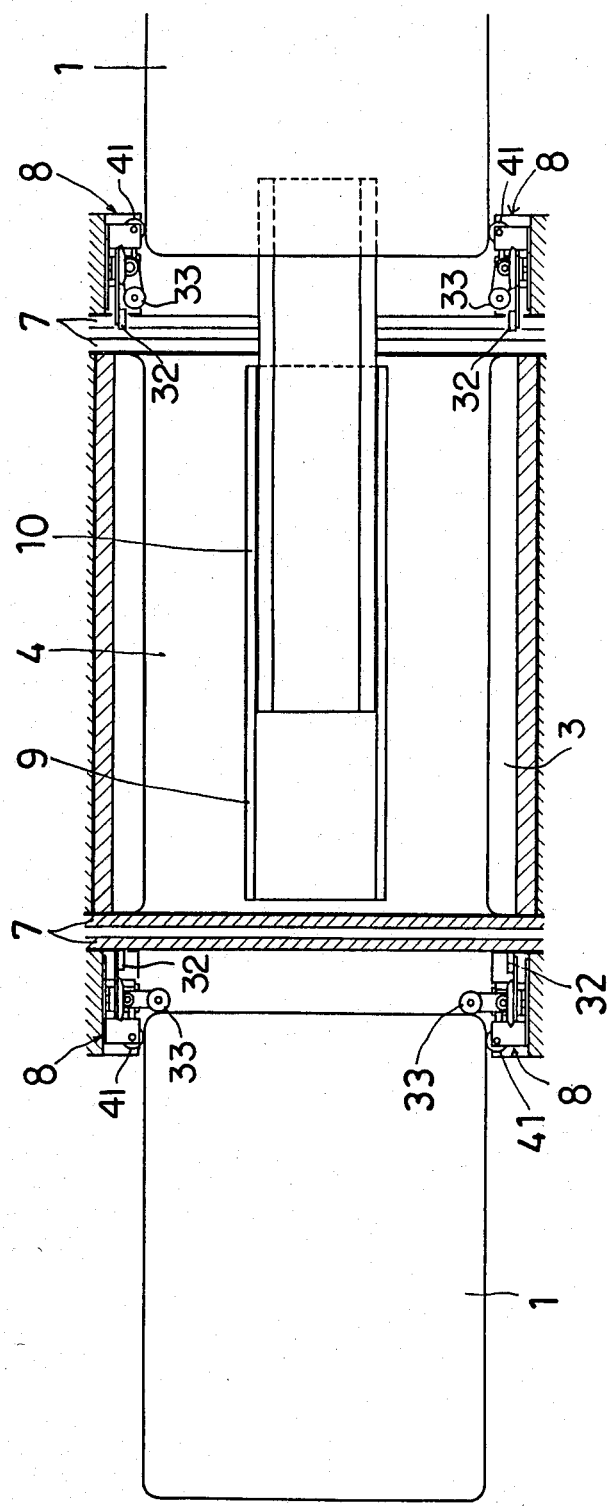
FIG. 1 is a plan view of the stopper device embodying the present invention, showing how it is used.
Figure 2:
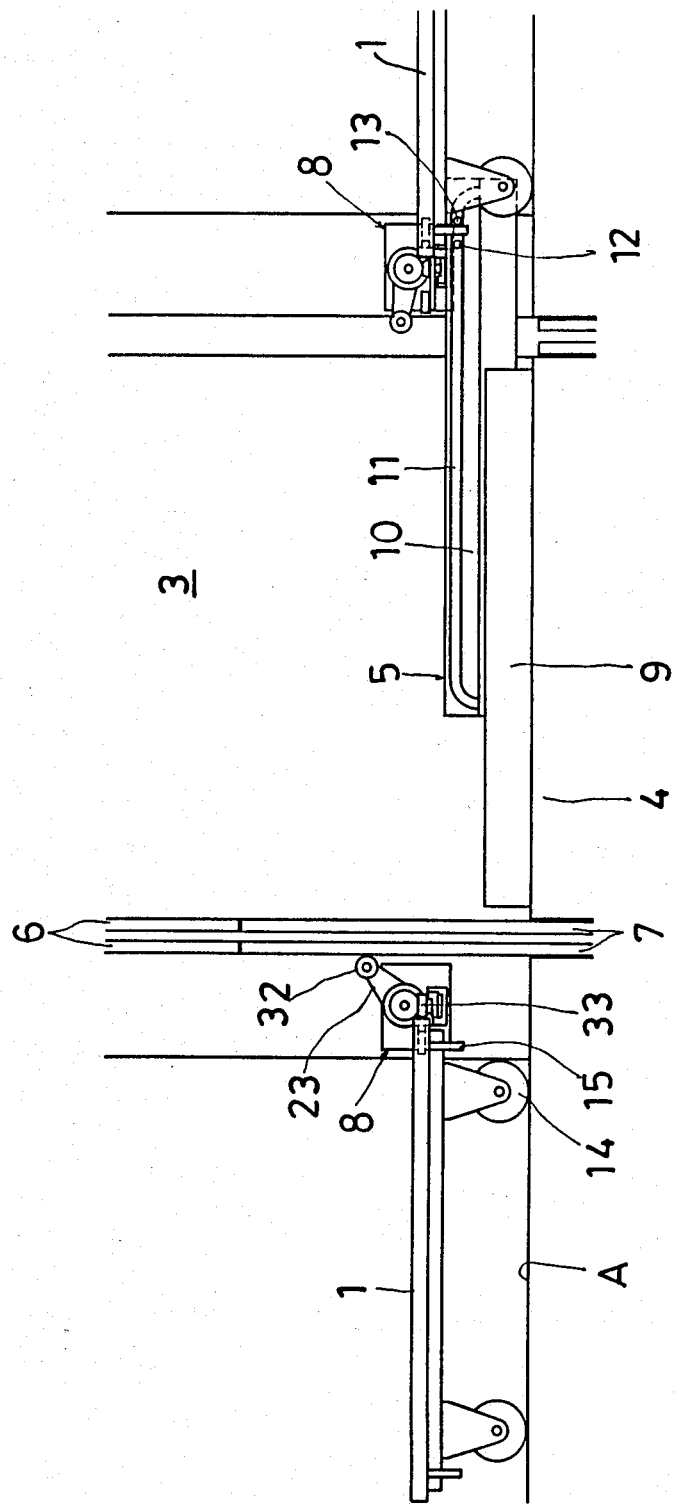
FIG. 2 is a front view thereof.

Referring now to FIGS. 1 and 2, an elevator 4 is adapted to ascend and descend in an elevator shaft 3 for conveying a push car 1 from the floor A of one story to another. A transfer apparatus 5 for loading and unloading the elevator 4 with the push car 1 is mounted on the elevator 4. Each opening of the elevator shaft 3 fronting on the floor A of each story is provided with a pair of upper leaves 6 and a pair of lower leaves 7 adapted to slide up and down, by means of which the opening may be closed and opened. Stopper devices 8 are provided on both sides of each opening at the lower part thereof.

The transfer apparatus 5 includes a base member 9 fixedly mounted on the elevator 4 and a carriage 10 supported on the base member 9. The travel of the carriage 10 ranges from the position where its full length installs itself on the base member 9 to the position where some portion of the carriage 10 projects from the elevator 4 to the floor A. A pair of endless chains 11 are mounted on the carriage 10 in the travel direction thereof. A pair of pins 12 and 13 are provided on each endless chain 11 so as to project horizontally from the endless chain 11, and each of them is adapted to be thrown only toward the other. A pair of downward pins 15 are secured to the undersurface of the push car 1, which is adapted to move on wheels 14. Each downward pin 15 is adapted to engage between the pins 12 and 13.

In order to draw the push car 1 from the floor A onto the elevator 4, the carriage 10 is moved toward the push car 1 as shown in the righthand portion of FIG. 2 until the leading end portion of the carriage 10 gets under the push car 1. When the endless chains 11 are moved, the downward pins 15 get engaged between the pins 12 and 13. The endless chains 11 are further run and the carriage 10 is restored to its original position so as to draw the push car 1 onto the elevator 4.

For delivering the push car 1 from the elevator 4 to a floor A, the carriage 10 is moved toward the floor A and the endless chains 11 are run with the pins 12 or 13 engaging with the downward pins 15.

Figure 3:
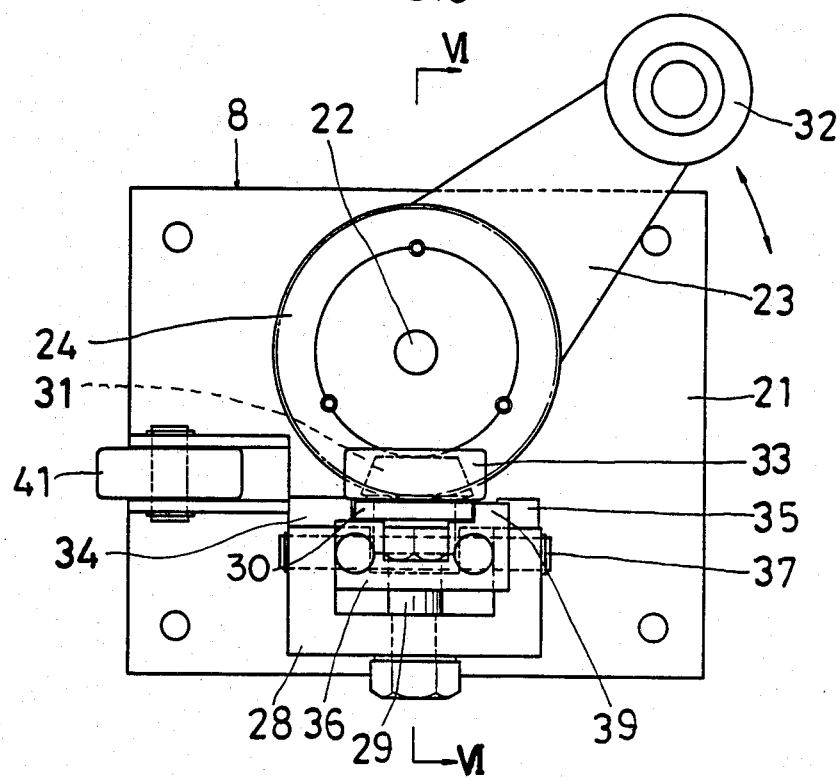
FIG. 3 is a front view of the stopper device.
Figure 7:
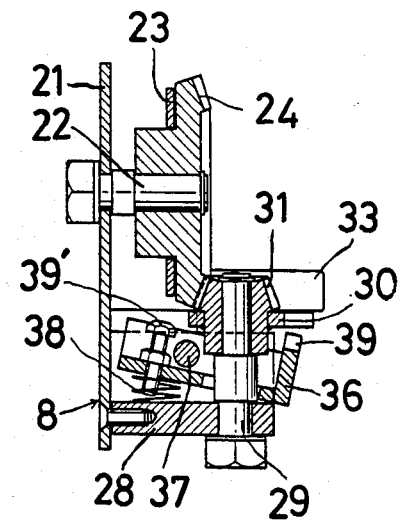
FIG. 7 is a view similar to FIG. 6 with the stopper released.

The structure of the stopper device 8 for stopping the push car 1 in position in front of an opening of the elevator shaft 3 is shown in FIGS. 3 and 7.

The stopper device 8 includes a vertical base plate 21, a shaft 22 mounted thereon to extend horizontally therefrom, a bevel gear 24 rotatably mounted on the shaft 22, and a vertically pivoting arm 23 having its base portion mounted on the bevel gear 24. The vertically pivoting arm 23 is provided with arcuate slots 25 (FIG. 5) which are arranged concentrically with the shaft 22 to receive screws 26 carried by the bevel gear 24. It will be apparent that by the provision of the arcuate slots 25 and the screws 26, the vertically pivoting arm 23 has some amount of play in the direction of the arrow shown in FIG. 5. The vertically pivoting arm 23 is normally urged downward in the counterclockwise direction in FIG. 5 by a spring 27 one end of which is secured to one of the screws 26 and the other end of which is secured to a pin 2 carried by the arm 23.

A U-shaped anchor block 28 is disposed under the shaft 22, and a shaft 29 extends vertically from the anchor block 28. A bevel pinion 31 is rotatably mounted on the shaft 29, and a horizontally pivoting arm 30 (FIGS. 4, 6 and 7) is connected at one end to the bevel pinion 31. Because of the bevel pinion 31 engaging with the bevel gear 24, the horizontal pivotal movement of the arm 30 is caused by the vertical pivotal movement of the arm 23.

Rollers 32 and 33 are rotatably mounted on the free ends of the vertically and horizontally pivoting arms 23 and 30, respectively. By the provision of stops 34 and 35 provided on both sides of the anchor block 28, the pivotal movement of the horizontally pivoting arm 30 is limited approximately to 90° ranging from a first position in which the arm 30 extends normal to the base plate 21 (FIG. 4) to a second position in which the arm 30 extends parallel with the base plate 21 (FIG. 7).

Figure 6:
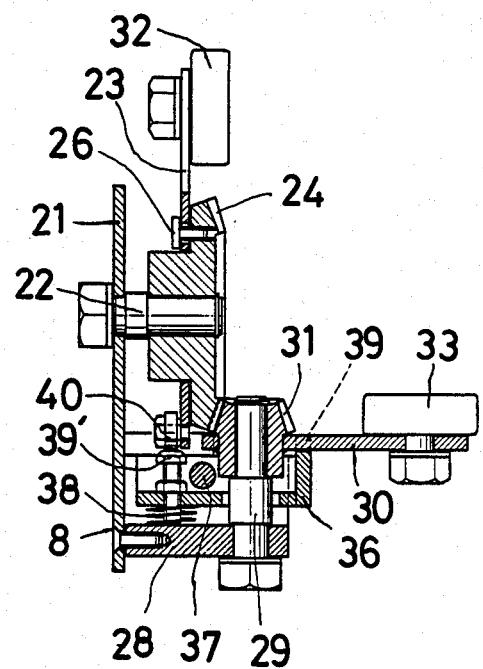
FIG. 6 is a vertical sectional view taken along the line VI—VI of FIG. 3.

The vertical shaft 29 extends through a stopper 36, which is pivotally carried on a horizontal shaft 37 supported by the side flanges of the anchor block 28. The stopper 36 is normally urged toward the clockwise direction in FIGS. 6 and 7 by a spring 38. When the web of the stopper 36 is swung to a horizontal position as shown in FIG. 6, a projection 39 provided on the anterior flange of the stopper 36 engages with a longitudinal edge of the horizontally pivoting arm 30 so as to hold it in a projecting position.

Figure 5:
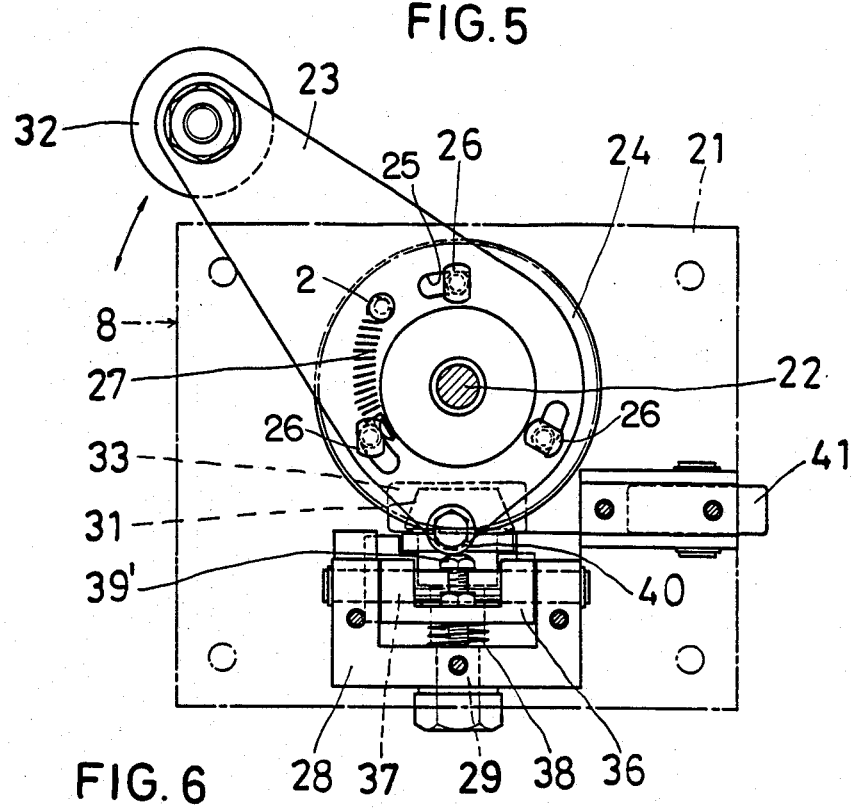
FIG. 5 is a vertical sectional back view thereof.

When the free end of the vertically pivoting arm 23 is in the uppermost position as shown in FIG. 5, a pushing member such as a cam 40 provided on its big end imparts downward motion to a projection 39' provided on the posterior end of the stopper 36. In this condition, the horizontally pivoting arm 30 is in the projecting position with its longitudinal edge engaged by the projection 39 of the stopper 36. Consequently, even if the push car 1 strikes against the roller 33, the horizontally pivoting arm 30 is prevented from pivotal movement toward the position in which the arm 30 extends parallel with the base plate 21.

Figure 4:
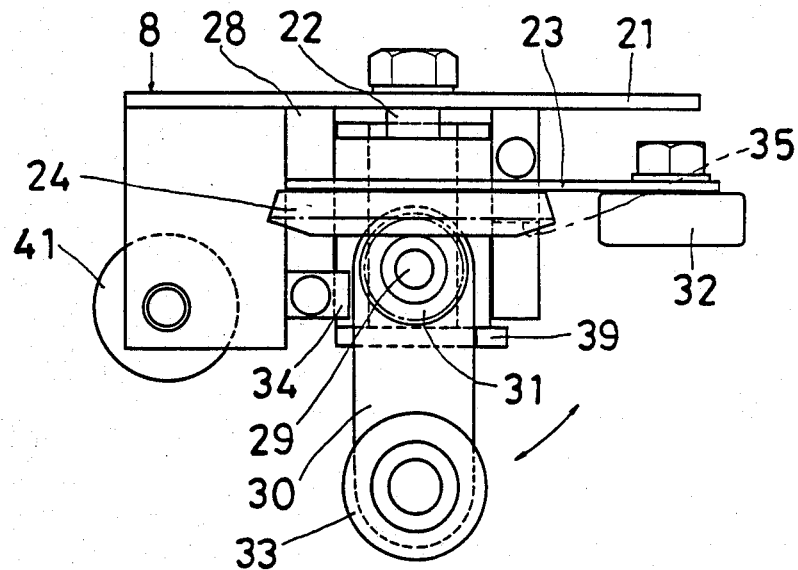
FIG. 4 is a plan view thereof.

In a position as high as the roller 33, a guide roller 41 is supported by a bracket projecting from the base plate 21 at the left-hand side of the horizontally pivoting arm 30 in FIGS. 3 and 4.

As shown in FIG. 1, the stopper devices 8 are disposed on both sides of each opening of the elevator shaft 3. As shown in FIG. 2, the height of the stopper devices 8 is conformed to that of the push car 1 so as to allow the push car 1 to strike against the rollers 33 of the horizontally pivoting arms 30. The horizontal distance between the stopper devices 8 and the lower leaf 7 is such that the latter in its closed position is in touch with the rollers 32 of the vertically pivoting arms 23 so as to keep the free ends of the arms 23 in the uppermost positions.

In operation, the push car 1 is stopped in position in front of an opening of the elevator shaft 3. This is effected by allowing the front end of the push car 1 to strike against the rollers 33 of the horizontally pivoting arms 30, which have been held in projecting positions because the lower leaf 7 in its closed position has been in touch with the rollers 32. In this prescribed position of the push car 1, the downward pins 15 are ready for engagement with the pins 12 and 13 provided on the endless chains 11.

When the elevator 4 comes flush with the floor A on which the push car 1 stands by, the upper and lower leaves 6 and 7 are opened and consequently the rollers 32 get out of touch with the lower leaf 7. Then, by the tension of the springs 27, the vertically pivoting arms 23 turn counterclockwise in FIG. 5 to the extent of the length of play furnished by the arcuate slots 25 and the screws 26. Then the cams 40 lose contact with the projections 39', and the tension of the springs 38 causes the stoppers 36 to turn clockwise in FIGS. 6 and 7 so as to disengage the projections 39 from the horizontally pivoting arms 30. Now the free ends of the vertically pivoting arms 23 can turn downwardly by gravity, and this vertical pivotal movement of the arms 23 is converted into a horizontal pivotal movement of the arms 30 through the bevel gears 24 and the bevel pinions 31. Thus the horizontally pivoting arms 30 come to the positions in which they extend parallel with the base plates 21. When the push car 1 is drawn toward the elevator 4, the rollers 33 and 41 serve as a guide for the push car 1.

The upper and lower leaves 6 and 7 are closed when the push car 1 has been drawn onto the elevator 4. In the course of closure, the lower leaf 7 pushes up the free ends of the vertically pivoting arms 23, and this vertical pivotal movement of the arms 23 is converted into a horizontal pivotal movement of arms 30 so as to move them to the projecting positions. The cams 40 impart pivotal movement to the stoppers 36 so as to allow the projections 39 to lock the horizontally pivoting arms 30 again.

Thus the present invention serves to automatize the work of loading the elevator 4 with the push car 1 and unloading the push car 1 from the elevator 4, because the push car 1 can be stopped in a prescribed position by the horizontally pivoting arms 30, and because the horizontal pivotal movement of the arms 30 for allowing the push car 1 to pass is caused by the vertical pivotal movement of the arms 23.

What I claim:

1. A stopper device for positioning a push car or the like in front of a door opening of an elevator shaft, the push car to be moved horizontally in a longitudinal direction through the opening when the door of the opening is open, the device comprising:

a first shaft to be mounted to a wall at a side of the opening, said first shaft extending perpendicularly to said longitudinal direction;

a bevel gear rotatably mounted on said first shaft;

a vertically pivoting arm having a first end and a second free end, said first end being mounted on said bevel gear so that said vertically pivoting arm is pivotable with said bevel gear in a vertically and longitudinally extending plane between an upper position and a lower position below said upper position;

a bevel pinion;

a horizontally pivoting arm connected at one end to said bevel pinion, said bevel pinion engaging with said bevel gear such that vertical pivotal movement of said vertically pivoting arm horizontally pivots said horizontally pivoting arm through said bevel pinion from a first position in which said horizontally pivoting arm extends parallel to said first shaft to a second position in which said horizontally pivoting arm extends parallel to said longitudinal direction;

a longitudinally extending second shaft disposed under said bevel gear;

a stopper pivotally carried on said second shaft and having one end on a first side of said second shaft pivotable upward to disengagably engage with said horizontally pivoting arm when said horizontally pivoting arm is in said first position, to unlockably lock said horizontally pivoting arm in said first position;

elastic means for elastically urging said stopper in a direction downward out of engagement with said horizontally pivoting arm; and means, including a cam secured to said first end of said vertically pivoting arm, for engaging on other end of said stopper with said cam on a second side of said second shaft opposite said first side when said vertically pivoting arm is pivoted into said upper position, to exert a downward force on said other end of said stopper against the bias of said elastic means to pivot said one end of said stopper into engagement with said horizontally pivoting arm and lock said horizontally pivoting arm in said first position;

said one end of said vertically pivoting arm being mounted on said bevel gear with sufficient play to permit said vertically pivoting arm to move relative to said bevel gear in an arc in said plane from said upper position to a position above said lower position in which said cam barely disengages from said other end of said stopper while said bevel gear is stationary.

2. A device as in claim 1, further comprising a spring connected to said first end of said vertically pivoting arm and said bevel gear so as to bias said vertically pivoting arm upward relative to said bevel gear.

3. An elevator arrangement comprising:

an elevator shaft having spaced apart side walls defining therebetween a door opening;

an elevator door for closing said opening, said door being vertically movable to expose said opening;

a pair of stopper devices on opposite sides of said opening for positioning a push car or the like in front of said door opening, the push car to be moved horizontally in a longitudinal direction through said opening when said door is open, each of said devices including:

a first shaft mounted to one of said side walls, said first shaft extending perpendicular to said longitudinal direction;

a bevel gear rotatably mounted on said first shaft;

a vertically pivoting arm having a first end and a second free end, said first end being mounted on said bevel gear so that said vertically pivoting arm is pivotable with said bevel gear in a vertically and longitudinally extending plane between an upper position and a lower position below said upper position, said free end engaging said door so as to be pivoted upward into said upper position when said door is closed and so as to pivot downward into said lower position when said door is open;

a bevel pinion;

a horizontally pivoting arm connected at one end to said bevel pinion, said bevel pinion engaging with said bevel gear such that vertically pivotal movement of said vertically pivoting arm horizontally pivots said horizontally pivoting arm through said bevel gear and said bevel pinion from a first position in which said horizontally pivoting arm extends parallel to said first shaft for contacting a front end of the push car positioned in front of said door when said door is closed so as to block longitudinal movement of the push car therepast, to a second position in which said horizontally pivoting arm extends parallel to said longitudinal direction out of the path of the push car;

a longitudinally extending second shaft disposed under said bevel gear;

a stopper pivotally carried on said second shaft and having one end on a first side of said second shaft pivotable upward to disengagably engage with said horizontally pivoting arm when said horizontally pivoting arm is in said first position, to unlockably lock said horizontally pivoting arm in said first position;

elastic means for elastically urging said stopper in a direction downward out of engagement with said horizontally pivoting arm; and means, including a cam secured to said first end of said vertically pivoting arm, for engaging an other end of said stopper with said cam on a second side of said second shaft opposite said first side when said vertically pivoting arm is pivoted into said upper position to exert a downward force on said other end of said stopper against the bias of said elastic means to pivot said one end of said stopper into engagement with said horizontally pivoting arm and lock said horizontally pivoting arm in said first position;

said one end of said vertically pivoting arm being mounted on said bevel gear with sufficient play to permit said vertically pivoting arm to move relative to said bevel gear in an arc in said plane from said upper position to a position above said lower position in which said cam barely disengages from said other end of said stopper while said bevel gear is stationary, such that when said door is opened and said free end of said vertically pivoting arm are separated from said door, said vertically pivoting arm moves in said arc to barely disengage said cam from said other end of said stopper, whereby said elastic means pivots said stopper out of engagement with said horizontally pivoting arm to unlock said horizontally pivoting arm.

4. An elevator arrangement as in claim 3, further comprising an elevator car in said shaft and means on said elevator car for pulling the push car onto the elevator car when said door is open.

5. An elevator arrangement as in claim 3, further comprising a spring connected to said first end of said vertically pivoting arm and said bevel gear so as to bias said vertically pivoting arm upward relative to said bevel gear.

6. An elevator arrangement comprising:

an elevator shaft having spaced apart side walls defining therebetween a door opening;

an elevator door for closing said opening, said door being vertically movable to expose said opening;

a pair of stopper devices on opposite sides of said opening for positioning a push car or the like in front of said door opening, the push car to be moved horizontally in a longitudinal direction through said opening when said door is open, each of said devices including:

first and second gears operatively engaging each other for converting between respective rotations about horizontal and vertical axes;

a vertically pivoting arm having a first end and a second free end, said first end being mounted on said first gear so that said vertically pivoting arm is pivotable with said first gear in a vertically and longitudinally extending plane between an upper position and a lower position below said upper position, said free end engaging said door so as to be pivoted upward into said upper position when said door is closed and so as to pivot downward into said lower position when said door is open;

a horizontally pivoting arm connected at one end to said second gear, said second gear engaging with said first gear such that vertically pivotal movement of said vertically pivoting arm horizontally pivots said horizontally pivoting arm through said second gear from a first position in which said horizontally pivoting arm extends perpendicularly to said longitudinal direction in front of the door for contacting a front end of the push car positioned in front of said door when said door is closed, so as to block longitudinal movement of the push car therepast, to a second position in which said horizontally pivoting arm extends parallel to said longitudinal direction out of the path of the push car; and stopper means, including a stopper engagable with said horizontally pivoting arm, for releasably holding said horizontally pivoting arm in said first position, said stopper means including means for holding said stopper in engagement with said horizontally pivoting arm only when said verticlly pivoting arm is in said upper position.

7. An arrangement as in claim 6, wherein said stopper is pivotally mounted on a longitudinally extending shaft, said stopper having one end on a first side of said second shaft pivotable upward to disengagably engage with said horizontally pivoting arm when said horizontally pivoting arm is in said first position, to unlockably lock said horizontally pivoting arm in said first position, said stopper means comprising elastic means for elastically urging said stopper pivotally in a direction out of engagement with said horizontally pivoting arm, said holding means including a cam secured to said first end of said vertically pivoting arm, for engaging on other end of said stopper with said cam on a second side of said second shaft opposite said first side when said vertically pivoting arm is pivoted into said upper position, to exert a downward force on said other end of said stopper against the bias of said elastic means to pivot said one end of said stopper into engagement with said horizontally pivoting arm and lock said horizontally pivoting arm in said first position.

8. An arrangement as in claim 7, wherein said one end of said vertically pivoting arm is mounted on said first gear with sufficient play to permit said vertically pivoting arm to move relative to said first gear in an arc in said plane from said upper position to a position above said lower position in which said cam barely disengages from said other end of said stopper while said bevel gear is stationary, such that when said door is opened and said free end of said vertically pivoting arm is separated from said door, said vertically pivoting arm moves in said arc to barely disengage said cam from said other end of said stopper, whereby said elastic means pivots said stopper out of engagement with said horizontally pivoting arm to unlock said horizontally pivoting arm.

9. A stopper device for positioning a push car or the like for use with an elevator in front of an elevator door, said device comprising:

a vertically pivoting arm, pivotable between an upper position and an lower position;

a horizontally pivoting arm, pivotable between an operative position and an inoperative position;

first and second gears engaged with each other and respectively mounted to said vertically pivoting arm and said horizontally pivoting arm such that pivotal movement of said vertically pivoting arm from said upper position to said lower position pivots said horizontally pivoting arm through said first and second gears from said operative position to said inoperative position and pivotal movement of said vertically pivoting arm from said lower position to said upper position pivots said horizontally pivoting arm through said first and second gears from said inoperative position to said operative position, said vertically pivoting arm including first bias means biasing said vertically pivoting arm and said first gear therewith in a direction from said upper position to said lower position thereby to bias through said first and second gears said horizontally pivoting arm toward said inoperative position, when said vertically pivoting arm is above said lower position; and stopper means, operatively engagable with said horizontally pivoting arm only when said horizontally pivoting arm is in said operative position, for holding said horizontally pivoting arm in said operative position.

10. An arrangement as in claim 9, wherein said stopper means includes a stopper pivotally mounted on a longitudinally extending shaft, said stopper having one end on a first side of said shaft pivotable upward to disengagably engage with said horizontally pivoting arm when said horizontally pivoting arm is in said operative position, said stopper means further including second bias means pivotally biasing said one end of said stopper downward and a cam secured to said first end of said vertically pivoting arm, for engaging an other end of said stopper with said cam on a second side of said shaft opposite said first side when said vertically pivoting arm is pivoted into said upper position, to exert a downward force on said other end of said stopper to pivot said one end of said stopper against the bias of said second bias means into engagement with said horizontally pivoting arm and lock said horizontally pivoting arm in said operative position.

11. An arrangement as in claim 10, wherein said one end of said vertically pivoting arm is mounted on said first gear with sufficient play to permit said vertically pivoting arm to move relative to said first gear in an arc from said upper position to a position above said lower position in which said cam barely disengages from said other end of said stopper while said first gear is staionary, such that when said horizontally pivoting arm is in said operative position and in the absence of an upward force on said vertically pivoting arm holding said vertically pivoting arm in said upper position, said vertically pivoting arm moves in said arc to barely disengage said cam from said other end of said stopper, whereby said second bias means pivots said stopper out of engagement with said horizontally pivoting arm to unlock said horizontally pivoting arm.

12. A device as in claim 9, wherein said vertically pivoting arm is so oriented that it is biased by gravitational forces thereof toward said lower position, said vertically pivoting arm forming said first biasing means.

* * * * *